United States Patent [19]

Pearson et al.

[11] Patent Number: 5,627,997
[45] Date of Patent: May 6, 1997

[54] METHOD AND SYSTEM FOR CONVERTING COMPUTER MAIL MESSAGES USING AN EXTENSIBLE SET OF CONVERSION ROUTINES

[75] Inventors: Malcolm E. Pearson, Bellevue, Wash.; Brian D. Bray, Vancouver, Canada

[73] Assignee: Microsoft Corporation, Redmond, Wash.

[21] Appl. No.: 254,925

[22] Filed: Jun. 7, 1994

[51] Int. Cl.$^6$ .............................. G06F 13/00; H04L 12/54
[52] U.S. Cl. ............... 395/500; 395/200.18; 395/200.01; 370/428
[58] Field of Search ..................... 395/500, 200.01, 395/200.18, 650, 600; 370/61

[56] References Cited

U.S. PATENT DOCUMENTS

| | | | |
|---|---|---|---|
| 4,559,614 | 12/1985 | Peek et al. ................... | 395/500 |
| 4,791,558 | 12/1988 | Chaitin et al. .................. | 395/500 |
| 5,119,465 | 6/1992 | Jack et al. ...................... | 395/500 |
| 5,261,080 | 11/1993 | Khoyi et al. .................... | 395/500 |
| 5,283,887 | 2/1994 | Zachery ......................... | 395/500 |
| 5,386,564 | 1/1995 | Shearer et al. ................. | 395/650 |
| 5,406,557 | 4/1995 | Baudoin ..................... | 395/200.18 |
| 5,418,908 | 5/1995 | Keller et al. .................. | 395/200 |
| 5,421,015 | 5/1995 | Khoyi et al. .................. | 395/650 |
| 5,446,880 | 8/1995 | Balgeman et al. ............ | 395/600 |
| 5,490,252 | 2/1996 | Macera et al. ............. | 395/200.01 |
| 5,497,319 | 3/1996 | Chong et al. ................. | 395/600 |
| 5,535,120 | 7/1996 | Chong et al. ............. | 364/419.03 |
| 5,557,780 | 9/1996 | Edwards et al. ............. | 395/500 |

Primary Examiner—Kevin J. Teska
Assistant Examiner—Tyrone V. Walker
Attorney, Agent, or Firm—Seed and Berry LLP

[57] ABSTRACT

A method and system for converting the format of computer mail messages using a dynamic set of conversion routines is provided. In a preferred embodiment, a message format conversion engine uses an updatable registry to access an extensible set of available conversion routines. The registry contains selection information and invocation information for each of the available conversion routines. The selection information in each case describes the classes of messages that the conversion routine is potentially capable of converting. The invocation information comprises information necessary to invoke the conversion routine. When a message is submitted to the conversion engine, the engine reads the selection information stored in the registry. The engine then uses the read selection information to select one of the available conversion routines likely to be capable of converting the message. The engine reads the invocation information stored in the registry for the selected conversion routine and uses it to invoke the selected conversion routine to convert the format of the message. In a further preferred embodiment, the conversion engine invokes the selected conversion routine in two stages. The engine first invokes a query method of a selected conversion routine, which indicates whether the selected conversion routine is actually capable of converting the message. If the invocation of the query method indicates that the selected conversion routine is actually capable of converting the message, then the engine invokes a convert method of the selected conversion routine in order to convert the format of the message.

30 Claims, 7 Drawing Sheets

METHOD AND SYSTEM FOR CONVERTING COMPUTER MAIL MESSAGES USING AN EXTENSIBLE SET OF CONVERSION ROUTINES

TECHNICAL FIELD

The invention relates generally to a method and system for processing computer mail messages, and, more specifically, to a method and system for converting the format of computer mail messages using a dynamic set of conversion routines.

BACKGROUND OF THE INVENTION

In a computer mail system, also known as an electronic mail system, a user may send messages to other users. The user to whom a message is sent is called the addressee of the message. Messages may contain text, or data in any other form. Messages sent within a computer mail system are typically transported across a computer network.

In order to enable the exchange of message between a larger number of users, two computer mail systems may be connected by a gateway. A gateway is a software facility that executes on a computer connected to both of the computer networks that each transport messages for one of the mail systems. FIG. 1 is a high-level block diagram of two mail systems connected by a conventional gateway. The gateway preferably operates on a computer system 100 which contains network connection 105 and network connection 106. Network connection 105 connects the computer system 100 to a first network 111. The first network 111 also connects to computer system 120 and computer system 130 via network connection 125 and network connection 135 respectively. The computer systems connected by the first network 111 comprise the first mail system 110. Similarly, a second mail system 160 is comprised of the computer systems connected by network 161. The computer systems connected by network 161 include computer system 100 via network connection 106, computer system 170 via network connection 176, and computer system 180 via network connection 186.

Gateways pass messages from an originating mail system to a receiving mail system, doing any necessary conversion from message formats used by the originating mail system to those used by the receiving mail system. Because mail systems are usually somewhat proprietary, a particular type of message may be formatted in one format for one mail system and in a different format for a different mail system. For example, in messages of some types, one mail system might use the American Standard Code for Information Interchange (ASCII) in the message, while another mail system might use the Extended Binary Code Decimal Interchange Code (EBCDIC) to represent each character of text.

In early mail systems, users sent messages of only one type, containing a block of undifferentiated text whose contents are not divided into portions having special significance. This made gateway message format conversion straightforward, as a typical gateway required only two different conversion routines ("converters"): one to translate an undifferentiated text messages from the format for a first mail system to the format for a second mail system, and one to translate from the format for the second mail system to the format for the first mail system. These converters are usually incorporated directly into the gateway by statically linking their code with the gateway's code.

In order to accommodate different, more specialized kinds of message content, new message types are now regularly being developed. Existing message types include notes with diverse contents, administrative messages such as non-delivery reports, electronic forms, and a variety of scheduling messages. In order for an existing gateway to convert messages of each newly developed type, the gateway must be rewritten to incorporate two new converters (i.e., a separate converter for converting messages traveling through the gateway in each direction). This rewriting of existing gateways has important disadvantages. First, because gateways are in most cases proprietary software products, only the original developers of a gateway have the information (most notably the original source code) necessary to rewrite the gateway. This prevents mail system administrators who administer gateways from themselves adding converters that they develop. Further, once the gateway is rewritten, the entire gateway must be distributed to any customers desiring to use the new converters. It is expensive to original developers of a gateway to have to redistribute the entire gateway, and it is a laborious process for a mail system administrator to install and configure an entire updated gateway.

SUMMARY OF THE INVENTION

It is an object of the invention to provide a method and system in a computer system for converting the format of a computer mail message using a dynamic set of conversion routines.

It is another object of the invention to provide a method and system in a computer system for passing a computer mail message from a first computer mail system to a second computer mail system and performing any necessary format conversion using an expandable set of conversion routines.

It is a further object of the invention to provide a method and system in a computer system for efficiently converting the format of a computer mail message using two levels of selection to select the appropriate conversion routine.

These and other objects, which will become apparent as the invention is more fully described below, are provided by a method and system for converting the format of computer mail messages using a dynamic set of conversion routines. In a preferred embodiment, a message format conversion engine uses an updatable registry to access an extensible set of available conversion routines. The registry contains selection information and invocation information for each of the available conversion routines. The selection information in each case describes the classes of messages that the conversion routine is potentially capable of converting. The invocation information comprises information necessary to invoke the conversion routine. When a message is submitted to the conversion engine, the engine reads the selection information stored in the registry. The engine then uses the read selection information to select one of the available conversion routines likely to be capable of converting the message. The engine reads the invocation information stored in the registry for the selected conversion routine and uses it to invoke the selected conversion routine to convert the format of the message. In a further preferred embodiment, the conversion engine invokes the selected conversion routine in two stages. The engine first invokes a query method of a selected conversion routine, which indicates whether the selected conversion routine is actually capable of converting the message. If the invocation of the query method indicates that the selected conversion routine is actually capable of converting the message, then the engine invokes a convert method of the selected conversion routine in order to convert the format of the message.

DETAILED DESCRIPTION OF THE INVENTION

Figure 1:
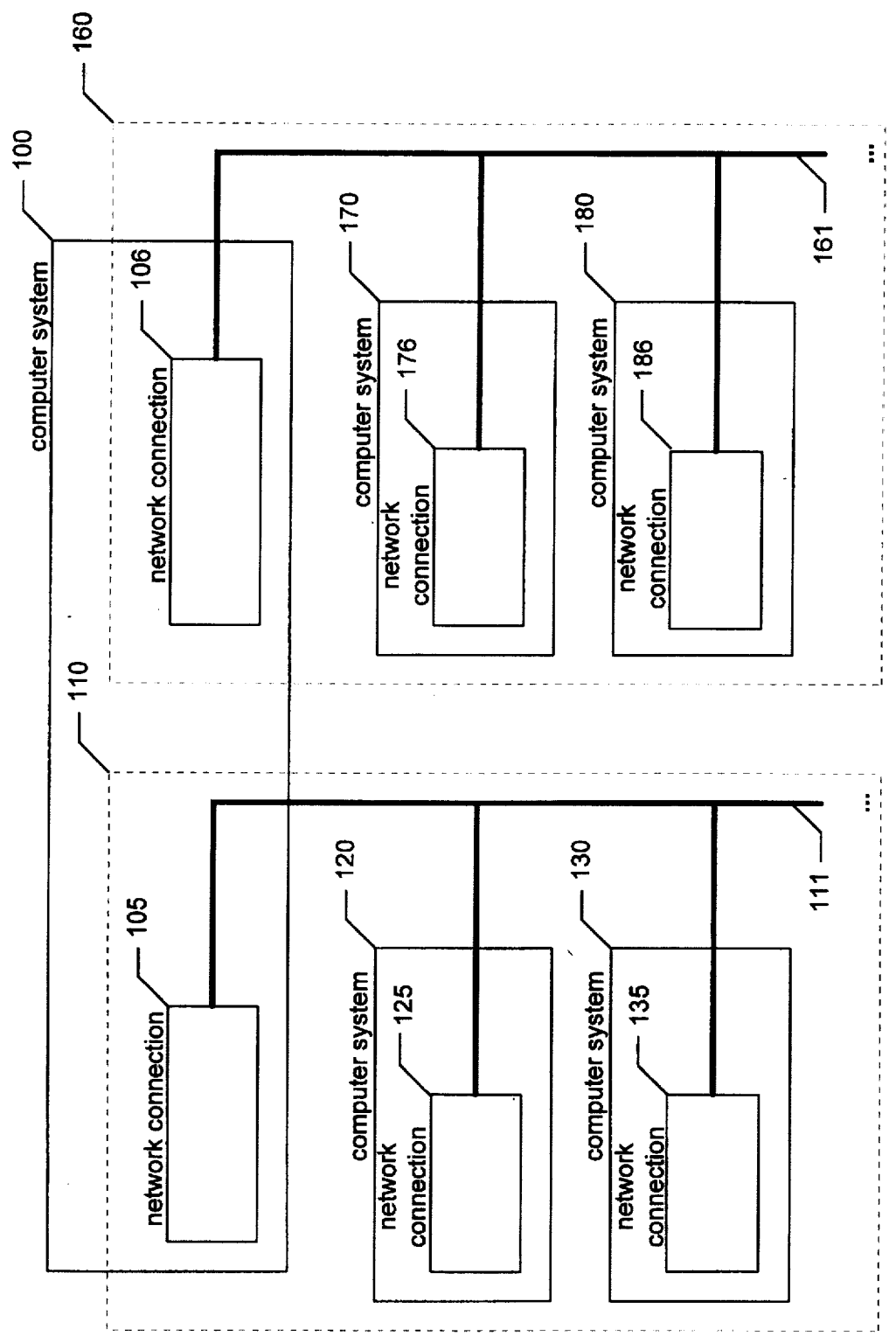
FIG. 1 is a high-level block diagram of two mail systems connected by a conventional gateway.

In a preferred embodiment, the present invention provides a method and system for converting computer mail messages ("messages") using a dynamic set of conversion routines (i.e., the conversion routines that are members of the set may change over time). In a preferred embodiment, a computer mail system gateway ("gateway") passes messages from an originating mail system to a receiving mail system. The gateway uses a dynamic converter set conversion engine ("engine") to convert each messages from a format supported by the originating mail system into a format supported by the receiving mail system. The engine is a software facility that governs the conversion of messages from one format to another. The engine applies conversion routines ("converters") that are identified by querying a converter registry ("registry"). The registry is an updatable list of all of the converters that are available to the engine, and contains selection and invocation information for each available converter. Because the registry is updatable, a new converter may be easily added to the registry for use by the engine at any time without significant disruption of any existing converters. The ability to add a new converter permits the gateway to be easily expanded to convert a wider variety of messages. When processing a message, the engine uses the selection information stored in the registry to select one or more converters that are potentially capable of converting the message. The engine then uses the invocation information stored in the registry to invoke one or more of the selected converters to convert the message into a proper format.

Converters are each preferably comprised of two executable methods, a Query method and a Convert method. Converters are invoked in two stages, by first invoking the Query method and then invoking the Convert method, as discussed below. The engine preferably uses the invocation information to invoke a Query method of each selected converter in turn. The Query method of each converter indicates whether that converter can actually convert the message. The first time an invoked Query method indicates that its converter is actually capable of converting the message, the engine uses the "related" or "referenced" invocation information to invoke a Convert method of that converter. When invoked, the Convert method actually converts the message. Query methods and Convert methods can preferably reside in any accessible dynamic link library ("DLL"), which permits new converters to be made available to the engine by either adding them to an existing DLL or creating a new DLL to contain them. As a result, the code for these methods consumes scarce memory only while the code is being used.

In a preferred embodiment, the Convert methods of certain converters are designed to invoke a user-supplied conversion routine, permitting novice users who are unfamiliar with DLLs to design their own converters for use by the gateway. In a further preferred embodiment, certain Convert methods may process the message in some other way than converting it into another message. For instance, if the purpose of a particular message is to update a database in the receiving mail system, a Convert method with access to the database could update the database in place of actually converting the message.

Figure 2:
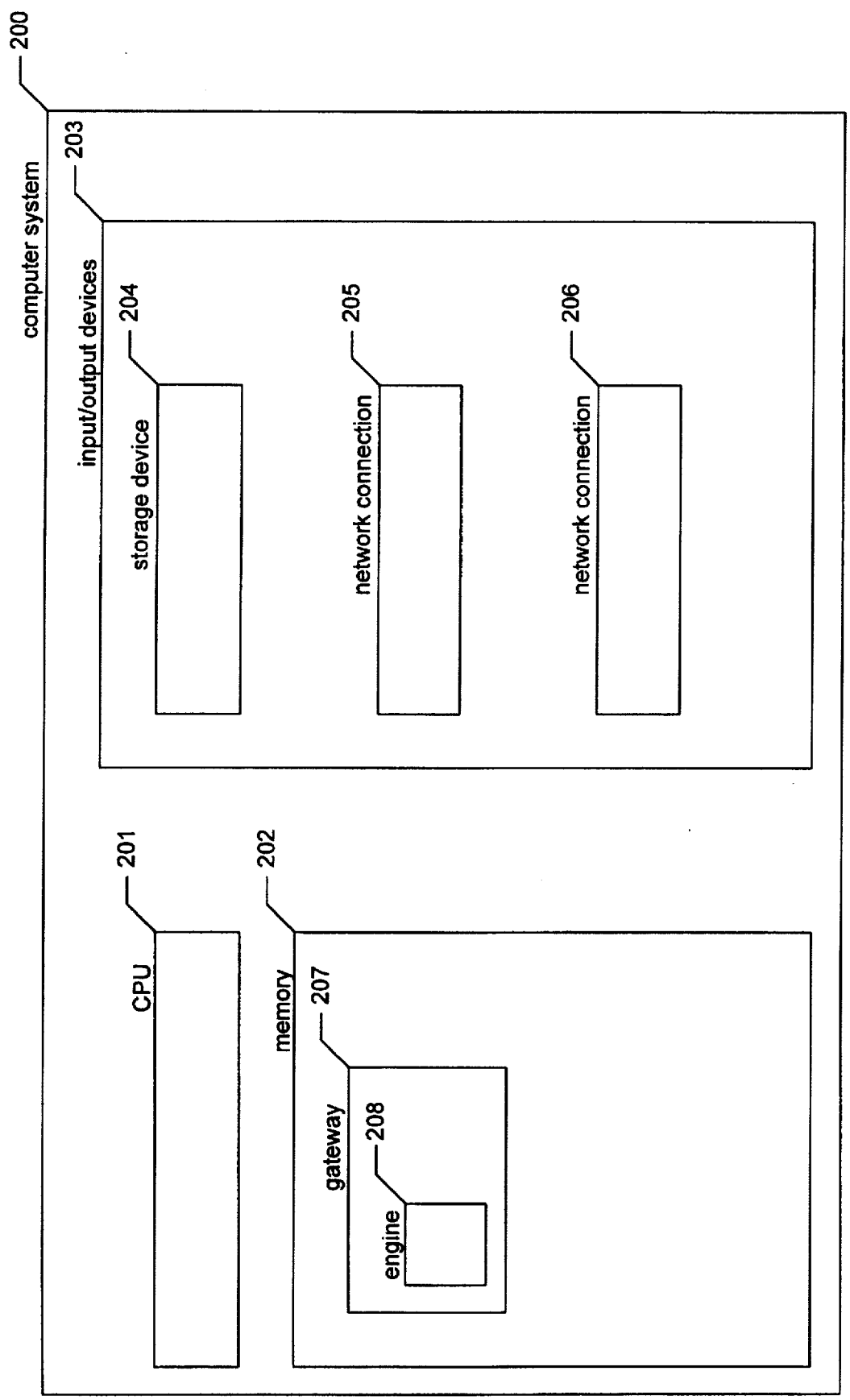
FIG. 2 is a high-level block diagram of the general-purpose computer system upon which the gateway and a dynamic converter set conversion engine preferably operate.

FIG. 2 is a high-level block diagram of the general-purpose computer system upon which the gateway and conversion engine preferably operate. The computer system 200 corresponds to computer system 100 in FIG. 1, and contains a central processing unit ("CPU") 201, a computer memory ("memory") 202, and input/output devices 203. Among the input/output devices is a storage device 204, such as a hard disk drive, and two network connections 205 and 206. Each network connection provides access to the network that carries traffic for one of the two mail systems connected by the gateway as described above. The gateway 207 and conversion engine 208, as well as other associated programs, preferably reside in the memory 202 and execute on the CPU 201. The registry and converters are preferably stored in the storage device 204, but may also be stored in the memory 202 or in a storage device connected to another computer system and accessed using one of the network connections.

Figure 3:
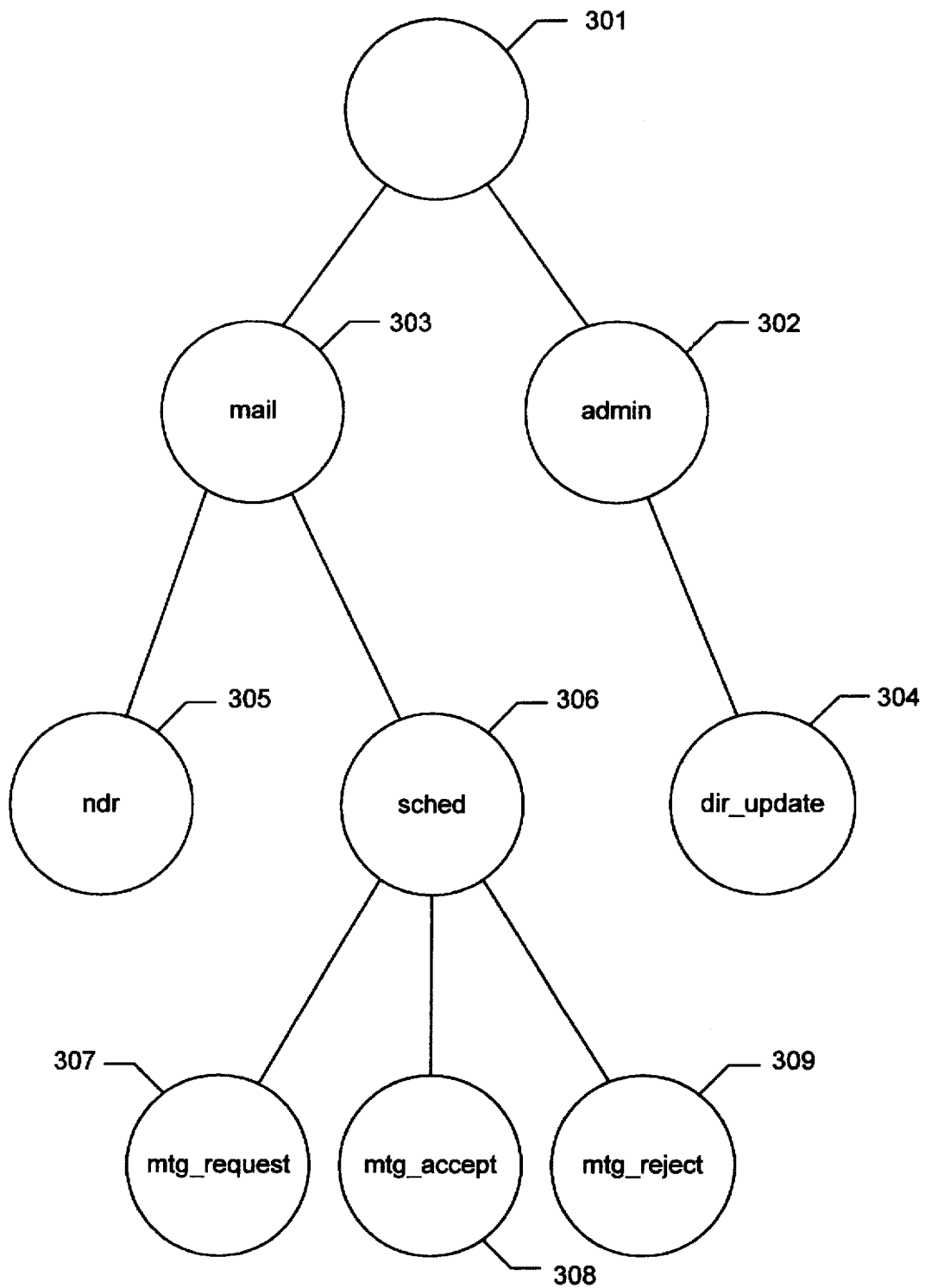
FIG. 3 is a tree diagram showing a tree representing a sample set of message classes.

The class of a received message, which determines the order in which converters are invoked. Message classes are arranged in a message class hierarchy, which can be represented by a class tree diagram. FIG. 3 is a tree diagram showing a tree representing a sample set of message classes. The tree is composed of nine nodes 301, 302, 303, 304, 305, 306, 307, 308, and 309. Each node represents a hierarchical class that can be used to characterize the contents of a message. The top node 301 is the root node of the tree. The class represented by the root node is no-class, and is general enough to encompass any message, i.e., all messages are a member of this class. Node 301 has two children, node 302 which represents an admin class for administrative messages directed to automated administrative agents and node 303 which represents a mail class for messages directed to users. Node 302 has one child, node 304 representing an admin.dir_update class for messages that transmit automatic user directory update transactions. Node 303 has two children, node 305 representing a mail.ndr class for messages containing non-delivery reports and node 306 representing a mail.sched class for messages containing scheduling communications. Node 306 has three children, node 307 representing a mail.sched.mtg$_{13}$ request class for requesting meetings, node 308 representing a mail.sched.mtg_accept class for accepting meetings, and node 309 representing a mail.sched.mtg_reject class for rejecting meetings.

If a first node can be reached from a second node by traveling exclusively upward through the tree, the first node is a "predecessor" of the second node, and the second node is a "descendant" of the first node. If the node representing a first class is a predecessor of a node representing a second class, the first class is said to be a "superclass" of the second class. This means that every message that is a member of the second class is also a member of the first class. Conversely, the second class is said to be a "subclass" of the first class. The second class is also "more specialized" than the first class. If no converters for the class attributed to a message are actually able to convert the message, the engine invokes the Query methods of converters for successive superclasses of the class attributed to the message.

Figure 4:
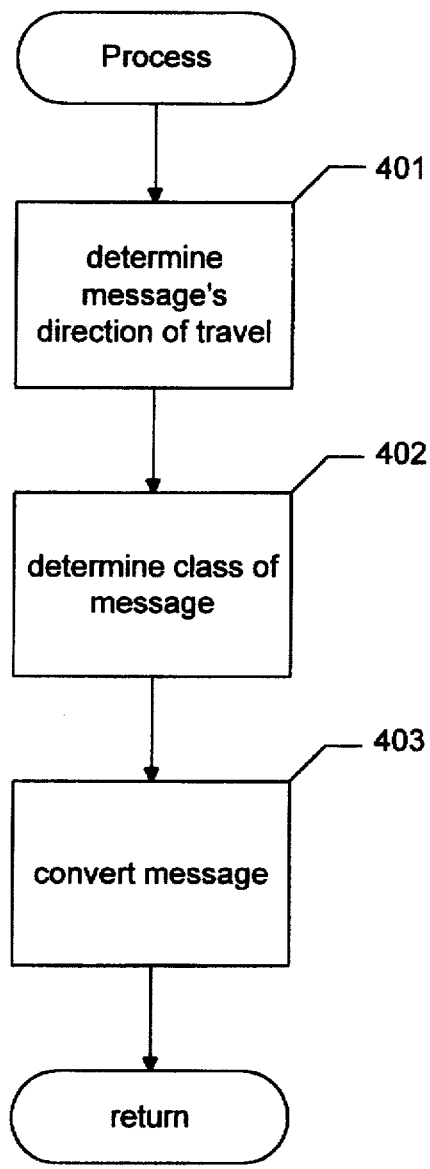
FIG. 4 is a flow diagram showing the steps performed by the engine in order to process a message traveling through the gateway.

When a user of the first mail system, known as the sender, addresses a message to a user of the second mail system, known as the receiver, the sender's mail program detects that the receiver's address is in the second mail system, and routes the message to the gateway. FIG. 4 is a flow diagram showing the steps performed by the engine in order to process a message traveling through the gateway. In step 401, the engine determines the direction in which the message is traveling through the gateway. As an example, if a message is traveling from the first mail system to the second mail system, the engine determines that the message is traveling in the 1 direction. Similarly, if a message is traveling from the second mail system to the first mail system, the engine determines that the message is traveling in the 2 direction. In step 402, the engine determines which class in the class tree best describes the contents of the message, i.e., the class of which the message is a member. In many cases, the mail program used by the message's sender knows the correct class for the message and includes a tag line like the following identifying it in the message's header:

---
message_type: mail.ndr
---

In this case, the engine attributes the class mail.ndr to the message. In other cases, the sending program is unaware of the messages correct class or omits including a header line. In such cases, the engine may either attribute the no-class class to the message, or endeavor to attribute a more specialized class based on an analysis of the message. Attributing a more specialized class based on an analysis of the message requires that the engine contain code for attributing the class that is capable of distinguishing between messages of different classes. As an example, the engine might search for a string commonly present in a non-delivery reports (e.g., "Returned mail: User unknown") and, if it finds this string, attribute the class mail.ndr to the message. For example, the engine uses the above methods to attribute the class mail.ndr and the 2 direction to a sample non-delivery report message traveling from the second mail system to the first mail system. This example is used to further clarify the behavior of the engine in the discussion that follows.

Figure 5:
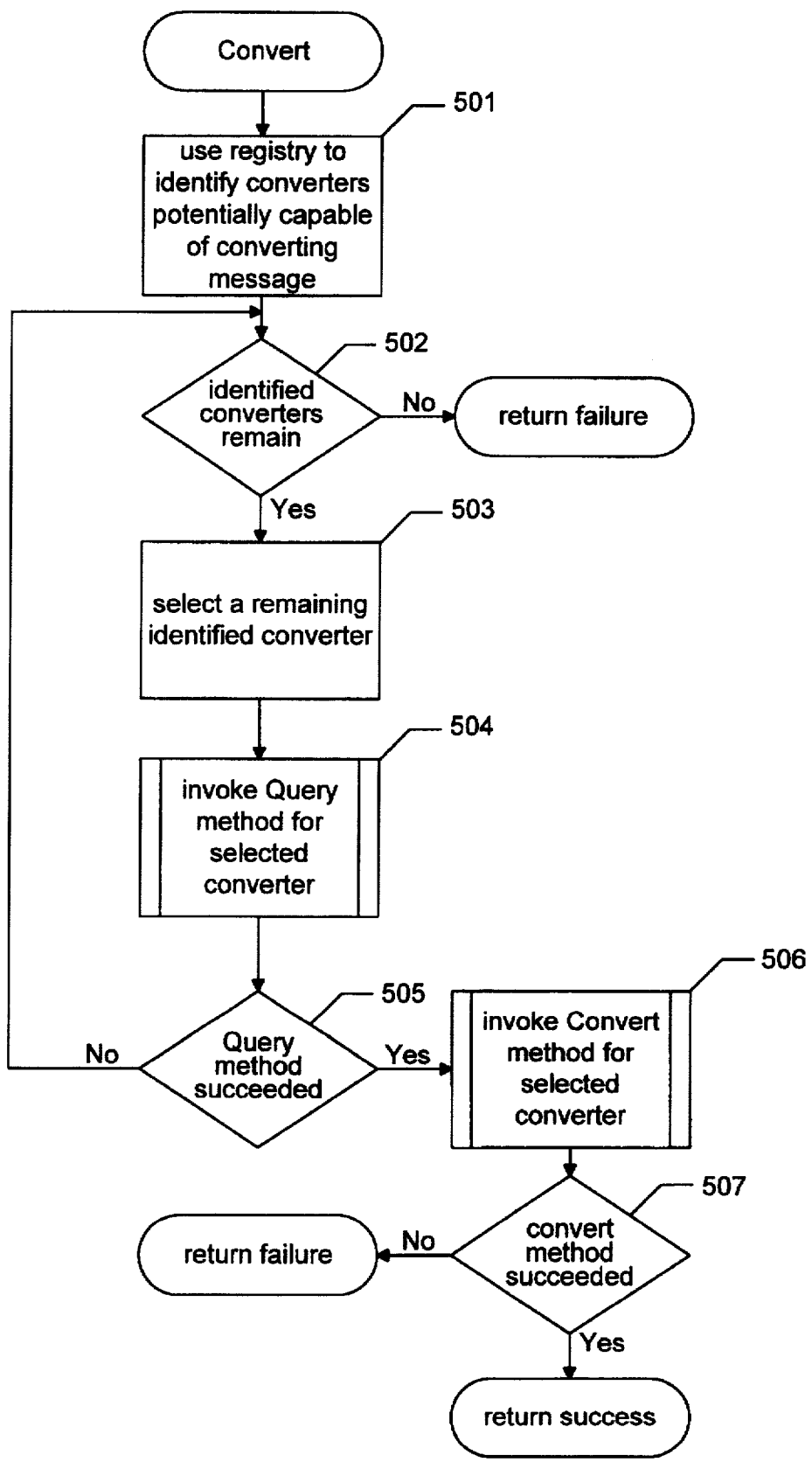
FIG. 5 is a flow diagram showing the steps performed by the engine in order to convert the message.

After the engine attributes a class and direction to the message, it attempts to convert it in step 403. FIG. 5 is a flow diagram showing the steps performed by the engine in order to convert the message. In step 501, the engine uses selection information stored in the registry, whose implementation is discussed in detail below, to identify converters that are potentially capable of converting the message. Step 501 involves querying the registry for converters that convert messages of the class attributed to the message or a superclass thereof, in the same direction that the message is traveling.

Figure 6:
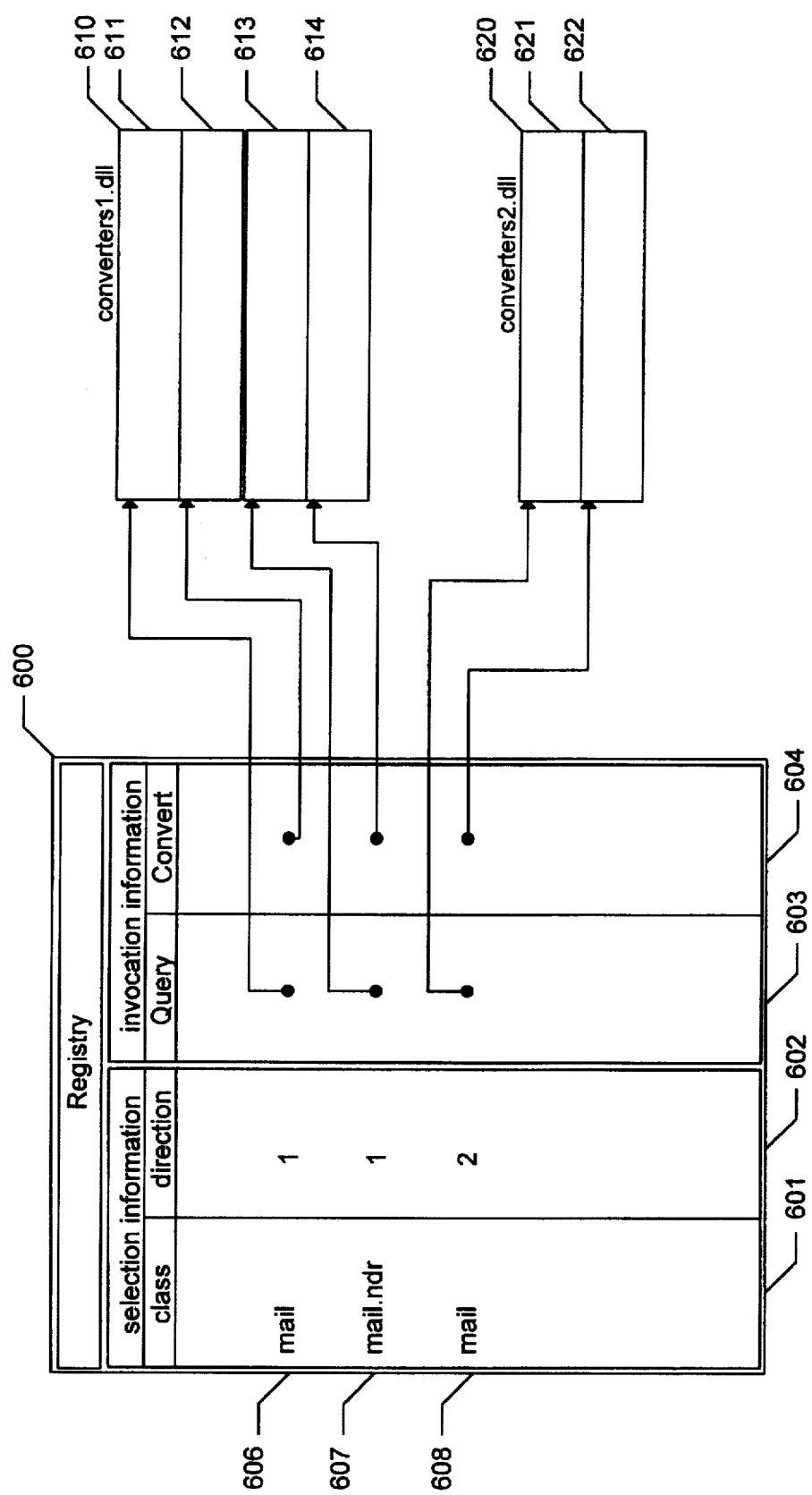
FIG. 6 is a data block diagram showing sample contents of the registry and illustrating the relationship between the registry and converters.

FIG. 6 is a data block diagram showing sample contents of the registry and illustrating the relationship between the registry and converters. The registry 600 contains information about available converters. Specifically, for each converter, the registry contains (a) a class 601 characterizing the types of messages that the converter is potentially capable of converting; (b) a conversion direction 602 indicating whether the converter converts messages passing from a first mail system to a second mail system (1) or messages passing from the second mail system to the first mail system (2); (c) an invocation reference 603 to the Query method of the converter; and (d) an invocation reference 604 to the Convert method of the converter. This registry 600 contains the above information for each of three sample converters 606, 607, and 608. For example, converter 608 converts messages of class mail, shown as node 303 in the message class tree of FIG. 3, traveling in the 1 direction. Converter methods are stored in method modules 610 and 620. Method module 610 is composed of four methods, 611, 612, 613, and 614. Method module 620 is composed of two methods, 621 and 622. In the example, querying the sample registry shown in FIG. 6 for mail.ndr messages traveling in the 2 direction, step 501 yields only converter 608 for mail messages traveling in the 2 direction. Note that the registry does not contain any converters for mail.ndr messages traveling in the 2 direction.

Each method module is preferably a DLL. The DLLs are preferably stored in the storage device until one of their methods is invoked using the invocation information. Upon invocation of one of its methods, a DLL is loaded into memory. After execution of the method concludes, the DLL may either be removed from memory or retained for later use (cached). Each invocation reference ("reference") stored in the registry is preferably comprised of a DLL identity and an entry point into the DLL. For example, the Query reference for converter 608 would contain the filename of the 620 DLL, "converters2.dll", and the first entry point.

Returning to FIG. 5, the engine identifies converters that convert messages of the class attributed to, the message or subclass thereof, in the same direction that the message is traveling in step 501 by searching for converters having the correct direction and having a class that begins with the class attributed to the message. In step 502, if the Query method of any of the converters identified in step 501 has not yet been invoked, then the engine continues at step 503 to select one of them, else the engine fails to convert the message. In step 503, the engine selects one of the identified converters not yet selected. All of the converters identified in step 501 can convert messages of the class attributed to the message or a superclass thereof. In order to try converters in the order of their likely suitability to convert the message, the engine preferably selects a converter whose selection information contains the closest class to the attributed class in the class tree. In the example, the engine selects the only converter identified, converter 608 for mail messages traveling in the 2 direction.

In step 504, the engine uses the invocation information stored in the registry for the selected converter to invoke the Query method for the converter. This invocation is known as "dereferencing" the reference to the Query method stored in the registry. The Query method determines whether the converter is actually capable of converting the message by checking to see whether any dependencies the converter has on anticipated contents of the original message are satisfied by the message that is being processed. For example, if a Convert method translates from ASCII to EBCDIC, the associated Query method determines whether the message that is being processed is actually in ASCII. That is, the Query method preferably checks to make sure that the character values for the message are within the acceptable range for ASCII character values. When the Query method returns, it passes back a ream code indicating whether the converter is actually capable of converting the message. In the example, the Query method of converter 608 returns a success return code. In step 505, if the return code indicates that the Query method succeeded and the converter is actually capable of converting the message, then the engine continues at step 506, else the engine continues at step 502 to select another identified converter if any remain. In step 506, the engine uses the invocation information stored in the registry for the selected converter to invoke the Convert method for the converter. This invocation is known as dereferencing the reference to the Convert method stored in the registry. In the example, the engine invokes the convert method for converter 608.

If the characters in mail messages are stored in EBCDIC in the second mail system and in ASCII in the first mail system, then the following pseudocode represents the Convert code for converter 608 stored in method 622:

```
for each character in original message
    translate the character from EBCDIC to ASCII
    insert translated character in converted message
return success
```

When the Convert method returns, it passes back a return code. In step 507, if the return code indicates that the Convert method successfully converted the message, then the engine succeeds at converting the message, else the engine fails at converting the message. In the case of the example, the Convert method returns a success return code, indicating that the Convert method of converter 608 was able to convert the non-delivery report by converting all of its characters from EBCDIC to ASCII.

While this conversion has succeeded, non-delivery reports may require additional conversion not performed by converter 608. For example, programs that receive non-delivery reports on the behalf of users in the first mail system may expect to read a special tag line in the header of each non-delivery report indicating the subject of the message that was not delivered, of the form:

```
non-delivered_subject: <subject>
```

Unless this tag line appears in the original non-delivery reports sent from the second mail system, it does not appear in the converted non-delivery reports generated by converter 608. In order to satisfy the expectation of receiving programs, a converter provider, such as the mail system administrator or the mail system provider, adds a new converter to the gateway to specifically handle non-delivery reports traveling in the 2 direction. The new converter must (a) convert the characters from EBCDIC to ASCII and (b) find the non-delivered subject in the original message (the remainder of the second line of the original message beginning with the string "Subject:") and use it to generate a non-delivered subject tag line in the header of the converted message.

The converter provider first codes the Query and Convert methods for the new converter. Pseudocode for the Query method would determine whether a non-delivered subject can be discerned from the original message:

```
go to beginning of message
find "Subject: "
if find "Subject: " fails then return failure
```

```
else return success
```

Pseudocode for the Convert method (a) converts the characters from EBCDIC to ASCII and (b) finds the non-delivered subject in the original message (the remainder of the second line of the original message beginning with the string "Subject:") and uses the non-delivered subject to generate a non-delivered subject tag line in the header of the converted message:

```
for each character in original message
    translate the character from EBCDIC to ASCII
    insert translated character in converted message
go to beginning of original message
find "Subject: "
find "Subject: "
store remainder of line
create new line in header of converted message
insert "non-delivered_subject: " in new line
insert stored text in new line
return success
```

Figure 7:
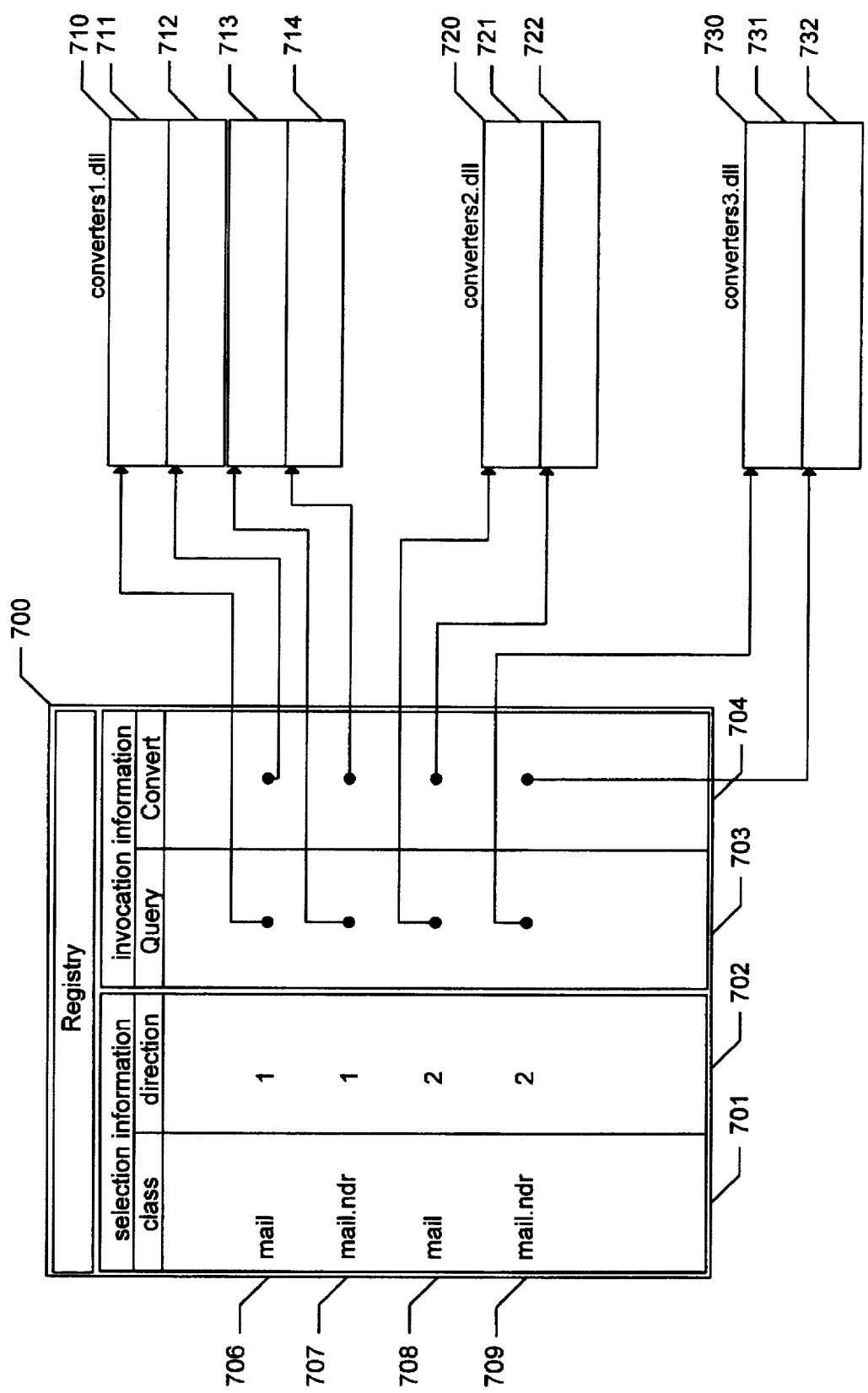
FIG. 7 is a data block diagram showing the addition of the new converter.

The converter provider stores compiled code for the methods of the new converter in an accessible DLL. The converter provider then adds an entry to the register for the new converter. FIG. 7 is a data block diagram showing the addition of the new converter. A new method module 730, named "converters3.dll," has been added, and contains the Query method 731 and the Convert method 732 for the new converter. A new row corresponding to the new converter 709 has been added to the registry, containing the class mail.ndr, the direction 2, and references to the Query and Convert methods of the new converter.

If, at this point, the gateway receives another non-delivery report traveling to the first mail system, the engine performs the steps shown in FIG. 5 again. In step 501, the engine identifies converters 708 and 709 as potentially capable of converting the message. In step 503, the engine selects the 709 converter first, as its class, mail.ndr, is the closest to (in fact, the same as) the attributed class of the message, mail.ndr. In step 504, the engine invokes the Query method of converter 709, which returns success, indicating the 709 converter is actually capable of converting the message. In step 506, the engine invokes the Convert method of converter 709, which translates the message to ASCII, generates the required non-delivered subject tag line, and returns success. The foregoing is an example of how the indirection used by the engine in selecting converters permits the gateway to be easily expanded to perform new conversions.

While this invention has been shown and described with reference to preferred embodiments, it will be understood by those skilled in the art that various changes or modifications in form and detail may be made without departing from the scope of the invention.

We claim:

1. A method in a computer mail system for converting a message having a class characterizing the content of the message from an original format to a destination format using a set of available conversion routines, each of the set of available conversion routines having selection information describing the classes of messages that the conversion routine was designed to convert and invocation information for use in invoking the conversion routine, the method comprising the steps of:

selecting one of the set of available conversion routines whose selection information indicates that it is designed to convert messages having the class or the message; and invoking the selected conversion routine to convert the message from the original format to the destination format using the read invocation information of the selected conversion routine, the method further including the step of selecting one or more conversion routines from the set of available conversion routines whose selection information indicates that it is designed to convert messages having the class of the message, and wherein each of the selected conversion routines includes a query method which indicates whether the conversion routine is capable of converting the message and a convert method, and wherein the invoking step includes the steps of:

invoking the query method of each of the selected conversion routines in turn until a query method indicates that the conversion routine is capable of converting the message; and invoking the convert method of the conversion routine that is capable of converting the message in order to convert the message.

2. The method of claim 1 wherein the invocation information comprises a reference to a method that enables the invocation of the method, and wherein the step of invoking query methods and the step of invoking a convert method each include the step of dereferencing the read reference to invoke a method.

3. The method of claim 2 wherein the reference to a method comprises an address indicating the location of the method in memory, and wherein the dereferencing step includes the step of jumping to the read address.

4. The method of claim 2 wherein the reference to a method comprises the identity of a dynamic link library and an entry point into the dynamic link library, and wherein the dereferencing step includes the step of jumping to the read entry point in the read dynamic link library.

5. The method of claim 1, further including the step of, from the invoked conversion routine, invoking a user-provided conversion program.

6. The method of claim 5 wherein each conversion routine of the set of available conversion routines is programmed in a first programming language, and wherein the user provided conversion program is programmed in a second programming language.

7. The method of claim 5 wherein each conversion routine of the set of available conversion routines is stored in a dynamic link library, and wherein the user provided conversion program is stored as an executable.

8. The method of claim 5, further including the step of selecting from a plurality of user-provided conversion programs one user-provided conversion program to be invoked by the step of invoking a user-provided conversion program.

9. A method in a gateway between a first computer mail system and a second computer mail system for translating a message passing from the first computer mail system to the second computer mail system from a format acceptable to the first mail system into a format acceptable to the second mail system, the message having content and a class characterizing the content of the message, the method including the steps of:

providing a multiplicity of conversion routines for converting the format of messages;

from the multiplicity of conversion routines, identifying a plurality of conversion routines, each of which is designed to convert messages of the class of the message;

providing a query method for each of the plurality of conversion routines for indicating whether the conversion routine is capable of converting a particular message;

invoking the query method of each conversion routine of the plurality until a query method indicates that the conversion routine is capable of converting the message;

providing a convert method for the conversion routine that is capable of converting the message; and invoking the convert method of the conversion routine that indicated that it is capable of converting the message in order to convert the message.

10. The method of claim 9 wherein the step of invoking the query method of each conversion routine invokes the query methods of the conversion routines in the order of their likelihood to indicate that their conversion routines are capable of converting the message.

11. The method of claim 9 wherein the class of the message is a member of a group of one or more classes, and wherein each conversion routine has a class of messages that it is designed to convert, and wherein the identifying step includes the step of determining whether, for each conversion routine, the class of messages that the conversion routine is designed to convert is among the group of classes.

12. The method of claim 11 wherein the class of the message is represented as a node in a tree of all classes, and wherein each conversion routine has a subtree of the tree of all classes that it is designed to convert, and wherein each subtree is defined by a head node, and wherein the step of invoking a query method of each conversion routine invokes the query methods of the conversion routines in decreasing order of the distance between the head node of each conversion routine and the node representing the class of the message.

13. The method of claim 9 wherein the multiplicity of conversion routines are each either for translating a message from a format acceptable to the first mail system into a format acceptable to the second mail system or for translating a message from a format acceptable to the second mail system into a format acceptable to the first mail system, further including the step of limiting the identified plurality of conversion routines to those that are for translating a message from a format acceptable to the first mail system into a format acceptable to the second mail system.

14. The method of claim 9 wherein each method is stored in a dynamic link library at an entry point, and wherein the invoking steps each include the step of jumping to the entry point at which the invoked method is stored in the dynamic link library in which the invoked method is stored.

15. A method in a computer mail system for processing a computer mail message using a plurally of message processing routines, the message having a class characterizing content contained in the message, the class of the message being represented as a node in the tree of all classes, each message processing routine having a subtree of the tree of all classes that it is designed to process, the method comprising the steps of:

identifying from a multiplicity of available message processing routines a plurality of message processing routines where, for each identified message processing routine, the node representing the class of the message is within the subtree of classes that the message processing routine is designed to process;

invoking a query method of each identified message processing routine until a message processing routine indicates that it is capable of processing the message; and invoking a processing method of the message processing routine that indicated that it is capable of processing the message in order to process the message.

16. The method of claim 15 wherein each subtree is defined by a head node, and wherein the step of invoking a query method of each message processing routine invokes the query methods of the message processing routines in decreasing order of the distance between the head node of each message processing routine and the node representing thee class of the message.

17. The method of claim 15 wherein the invoking steps each include the step of jumping to a selected entry point in a selected dynamic link library.

18. A computer mail message format conversion system using a dynamic set of conversion routines, comprising:
   a conversion memory for storing a plurality of conversion routines;
   a registry memory for storing entries each describing a conversion routine, each entry containing selection information identifying classes characterizing message content that the conversion routine is designed to convert and invocation information indicating how the conversion routine may be invoked, the invocation information including query method invocation information indicating how a query method for the conversion routine may be invoked; and
   a conversion engine that, for each message, uses selection information stored in the registry memory to select a conversion routine based on the class of the message, uses the query method invocation information stored in the registry memory for the query method for the selected conversion to invoke the query method routine to verify that the selected conversion routine is capable of converting the content of the message, and uses invocation information from the registry memory to invoke the selected conversion routine.

19. The system of claim 18, further including a conversion routine addition facility for storing an additional conversion routine in the conversion memory and storing an additional entry in the registry memory containing selection information and invocation information for the additional conversion routine, whereby the plurality of conversion routines may be dynamically expanded.

20. In a computer mail gateway for passing a message between two mail systems, the gateway having a conversion memory for storing a plurality of available conversion routines and a registry memory for storing entries each describing an available conversion routine, each entry containing selection information describing the identifying classes characterizing message content that the conversion routine is designed to convert and invocation information indicating how the conversion routine may be invoked, the invocation information including query method invocation information indicating how a query method for the conversion routine may be invoked, a computer mail message conversion engine for converting the format of a message having content that is passed between the two mail systems, comprising:
   a selection subsystem for using the selection information stored in the registry memory to select a conversion routine to convert the format of the message based upon the class of the message; and
   an invocation subsystem for using the query method invocation information stored in the registry memory for the query method for the selected conversion routine to invoke the query method for the selected conversion routine to verify that the selected conversion routine is capable of converting the content of the message, and for using the invocation information stored in the registry memory to invoke the conversion routine selected by the selection subsystem.

21. A compound computer mail system for exchanging computer mail messages, comprising:
   a first mail system containing at least one node from which messages may be sent and received in any of a first set of formats;
   a second mail system containing at least one node from which messages may be sent and received in any of a second set of formats each corresponding to one of the first set of formats; and
   a gateway connected to both the first mail system and the second mail system for exchanging messages between the first mail system and the second mail system, the gateway comprising:
   a conversion memory for storing a plurality of available conversion routines,
   a registry memory for storing entries each describing a conversion routine, each entry containing selection information describing the message formats that the conversion routine is designed to convert and invocation information indicating how the conversion routine may be invoked, the invocation information including query method invocation information indicating how a query method for the conversion routine may be invoked, and
   a conversion engine that, for each message, uses selection information stored in the registry memory to select an available conversion routine based upon the format of the message, uses the query method invocation information stored in the registry memory for the query method for the selected conversion routine to invoke the query method for the selected conversion routine to verify that the selected conversion routine is capable of converting the content of the message, and uses invocation information from the registry memory to invoke the selected conversion routine.

22. The system of claim 21, further including a conversion routine addition facility for storing an additional conversion routine in the conversion memory and storing an additional entry in the registry memory containing selection information and invocation information for the additional conversion routine, whereby the plurality of conversion routines may be dynamically expanded.

23. The method of claim 1, further comprising the steps of:
   storing code for a new conversion routine;
   adding to the registry selection information identifying classes of messages at least some members of which the conversion routine for which the code was stored is capable of converting; and
   storing invocation information in the added row of the registry indicating how the stored code may be invoked, and wherein the new conversion routine is the available conversion routine selected in the selecting step.

24. The method of claim 23 wherein messages to be converted by the conversion engine each have a message class characterizing content of the message, the step of storing selection information including the step of storing an indication of one or more message classes that the conversion routine for which the code was stored is designed to convert.

25. The method of claim 1, further including the steps of:
   storing query code for determining whether the conversion routine is actually capable of converting a particular message for access by the conversion engine; and storing an indication of how to invoke the developed query code in the created registry entry, and wherein the step of invoking the query method invokes the stored query code using the stored indication.

26. The method of claim 23 wherein the step of storing invocation information includes the step of storing a reference to a method that may be dereferenced in order to invoke the stored code.

27. The method of claim 26 wherein the step of storing code for the conversion routine includes the step of storing code for the conversion routine in a selected dynamic link library, and wherein the step of storing a reference to a method includes the step of storing an indication identifying the selected dynamic link library and an entry point into the selected dynamic link library at which the dynamic link library may be entered in order to invoke the stored code.

28. An instance of computer-readable media whose contents cause a computer mail system to convert a message having a class characterizing content of the message from an original format to a destination format using a extensible set of available conversion routines, the system having a registry containing, for each of the set of available conversion routines, selection information describing the classes of messages that the conversion routine is designed to convert and invocation information for use in invoking the conversion routine, by performing the steps of:

reading selection information stored in the registry;

selecting one of the set of available conversion routines designed to convert messages of the same class as the message using the read selection information;

reading invocation information stored in the registry for invoking the selected conversion routine; and invoking the selected conversion routine to convert the message from the original format to the destination format using the read invocation information, the instance of computer-readable media further causing the computer mail system to perform the step of selecting one or more further conversion routines from the set of available conversion routines that are designed to convert the message using the read selection information, and wherein each of the selected conversion routines includes a query method which indicates whether the conversion routine is actually capable of converting the message and a convert method, and wherein the invoking step includes the steps of:

invoking the query method of each of the selected conversion routines in turn until a query method indicates that the conversion routine is actually capable of converting the message; and invoking the convert method of the conversion routine that is actually capable of converting the message in order to convert the message.

29. A computer-readable memory device that contains an electronic mail message conversion registry data structure comprising a plurality of entries, each entry corresponding to a different electronic mail message conversion routine and comprising:

selection information describing classes of messages that the conversion routine is designed to convert; and invocation information for use in invoking the conversion routine, the invocation information including query method invocation information indicating how a query method for the conversion routine may be invoked, such that a conversion engine using the electronic mail message conversion registry data structure may use the selection information of one or more entries to select a conversion routine, may use the query method invocation information for the selected conversion routine to invoke the query method for the selected conversion routine to verify that the selected conversion routine is capable of converting the content of the message, and may use the invocation information of the entry for the selected conversion routine to invoke the selected conversion routine.

30. The computer-readable memory device of claim 29 wherein the invocation information of each entry includes invocation information for both a conversion method of the conversion routine and for a query method of the conversion routine, such that a conversion engine using the electronic mail message conversion registry data structure to convert a received message may use the invocation information for the query method of the selected conversion routine to invoke the query method of the selected conversion routine to confirm that the selected converter is capable of converting the received message, and may use the invocation information for the convert method of the selected conversion routine to invoke the converter method to convert the received message.

* * * * *

UNITED STATES PATENT AND TRADEMARK OFFICE
CERTIFICATE OF CORRECTION

PATENT NO. : 5,627,997
DATED : May 6, 1997
INVENTOR(S) : Malcolm E. Pearson and Brian D. Bray It is certified that error appears in the above-indentified patent and that said Letters Patent is hereby corrected as shown below:

In column 8, claim 1, line 12, following "class", please delete "or" and insert --of--.

In column 9, claim 1, line 5, following "more", please insert --further--.

In column 11, claim 16, line 7, please delete "thee" and insert --the--.

Signed and Sealed this

Twenty-third Day of September, 1997

*Attest:*

BRUCE LEHMAN

*Attesting Officer*  *Commissioner of Patents and Trademarks*